(12) United States Patent
Boesgaard

(10) Patent No.: US 12,518,034 B2
(45) Date of Patent: Jan. 6, 2026

(54) DATABASE SERVER SYSTEM

(71) Applicant: PII GUARD APS, Greve (DK)

(72) Inventor: Martin Staal Boesgaard, Solrod Strand (DK)

(73) Assignee: PII GUARD APS, Greve (DK)

(*) Notice: Subject to any disclaimer, the term of this patent is extended or adjusted under 35 U.S.C. 154(b) by 143 days.

(21) Appl. No.: 18/013,396

(22) PCT Filed: Jun. 29, 2021

(86) PCT No.: PCT/EP2021/067881
§ 371 (c)(1),
(2) Date: Dec. 28, 2022

(87) PCT Pub. No.: WO2022/002959
PCT Pub. Date: Jan. 6, 2022

(65) Prior Publication Data
US 2023/0244796 A1 Aug. 3, 2023

(30) Foreign Application Priority Data

Jun. 30, 2020 (EP) ..................................... 20183234
Nov. 2, 2020 (EP) ..................................... 20205230

(51) Int. Cl.
G06F 21/62 (2013.01)
G06F 16/23 (2019.01)
(Continued)

(52) U.S. Cl.
CPC ........ *G06F 21/6209* (2013.01); *G06F 16/235* (2019.01); *G06F 21/602* (2013.01);
(Continued)

(58) Field of Classification Search
CPC .... G06F 21/602; G06F 21/60; G06F 21/6227; G06F 21/606; G06F 21/6218;
(Continued)

(56) References Cited

U.S. PATENT DOCUMENTS 10,248,808 B2 * 4/2019 Kato ...................... H04L 63/045
11,790,099 B1 * 10/2023 Mujumdar .............. H04L 63/20
726/1

(Continued)

OTHER PUBLICATIONS

Search Report from corresponding European Application No. 20205230. 4, Apr. 8, 2021.

(Continued)

*Primary Examiner* — Shaqueal D Wade-Wright
(74) *Attorney, Agent, or Firm* — Workman Nydegger

(57) ABSTRACT

A database server system is provided for computer-implemented communication of electronic data between a computer-readable storage medium for storing such data and a computer-implemented application for performing at least one operation to the data. The data are structured in a first table of rows and columns defining a plurality of data cells. The database server system is configured to receive a read request from the application to return data of the data cells, and perform a format-preserving encryption or decryption operation to the data in the at least one of the data cells prior to returning the data to the application, and/or to receive a create or an update request from the application, wherein the create or update request causes a write operation to at least one of the data cells in the storage medium. A format-preserving encryption or decryption operation is performed prior to carrying out the write operation.

16 Claims, 4 Drawing Sheets

Before deploying encryption:

Table:
EmailAndPhone

After deploying encryption:

View:           Table:
EmailAndPhone   EmailAndPhone_Data

(51) Int. Cl.
*G06F 21/60* (2013.01)
*H04L 9/40* (2022.01)

(52) U.S. Cl.
CPC ...... *G06F 21/6218* (2013.01); *G06F 21/6227* (2013.01); *H04L 63/10* (2013.01); *H04L 63/0428* (2013.01); *H04L 63/101* (2013.01)

(58) Field of Classification Search
CPC .... G06F 21/62; G06F 21/6209; G06F 16/235; H04L 63/0428; H04L 63/10; H04L 63/101
See application file for complete search history.

(56) References Cited

U.S. PATENT DOCUMENTS

| | | | | |
|---|---|---|---|---|
| 2003/0046572 | A1* | 3/2003 | Newman | H04L 9/0825 |
| | | | | 713/193 |
| 2010/0161995 | A1* | 6/2010 | Browning | H04L 9/0891 |
| | | | | 713/189 |
| 2014/0108813 | A1* | 4/2014 | Pauker | H04L 9/0618 |
| | | | | 713/189 |
| 2020/0394317 | A1* | 12/2020 | White | H04L 9/14 |
| 2024/0020400 | A1* | 1/2024 | Chen | G06F 21/6227 |

OTHER PUBLICATIONS

International Search Report from PCT Application No. PCT/EP2021/067881, Sep. 7, 2021.
Gupta et al., "Ensuring Data Security in Databases Using Format Preserving Encryption," 2018 8th International Conference on Cloud Computing, Data Science & Engineering (Confluence), IEEE, Jan. 11, 2018, pp. 214-218.

* cited by examiner

DATABASE SERVER SYSTEM

TECHNICAL FIELD

The present invention relates to a database server system for computer-implemented communication of electronic data between a computer-readable storage medium for storing such data and a computer-implemented application for performing at least one of create, read, update and delete operations to the data, wherein the data are structured in a table of rows and columns defining a plurality of data cells.

SUMMARY OF THE INVENTION

It is an object of embodiments of the invention to protect personally identifiable information and other sensitive information stored in a database server system and/or communicated to/from a database server system. This can improve security, improve protection of personal information, aid complying with privacy regulations, reduce the risk of data leak, and facilitate that data can be used for more purposes than otherwise.

In a first aspect the invention provides a database server system for computer-implemented communication of electronic data between a computer-readable storage medium for storing such data and a computer-implemented application for performing at least one of create, read, update and delete operations to the data, wherein the data are structured in a first table of rows and columns defining a plurality of data cells, wherein the database server system is configured to:
receive a read request from the application to return, from the database server system to the application, data in (i.e. from) at least one of the data cells, and perform a format-preserving encryption or decryption operation to the data in (i.e. from) the at least one of the data cells prior to returning the data to the application,
and/or to
receive a create or an update request from the application, wherein the create or update request causes a write operation to at least one of the data cells in the storage medium, and perform a format-preserving encryption or decryption operation to the data in the at least one of the data cells prior to carrying out the write operation.

Format-preserving encryption is to be understood in the present contest as a procedure encompassing an encryption algorithm constructed such that it can encrypt information of a certain type (e.g. an e-mail address) in such a way that the encrypted version respects the format of the certain type.

When applying "classical" encryption, in which the format of the data is not preserved, the encrypted data are typically binary, and will take up more storage space than the original data. Thereby tables, etc., need to be redesigned in order to accommodate the encrypted data. However, when applying format-preserving encryption, the original format is preserved, thereby allowing the encrypted data to be easily stored in a database, without requiring redesign of tables, etc., and without requiring additional storage space.

Furthermore, applying format-preserving encryption allows a number of operations to be performed to the data in encrypted form, thereby reducing the need for decryption of the data, because an application which performs such operations receives the data in the correct format, and the operations can therefore be performed on the encrypted data in the same manner as if the data had been decrypted. This increases performance as well as security.

Finally, applying format-preserving encryption reduces the risk of erroneous handling of the data. For instance, in the case that a given user is not authorized to receive data in a decrypted form, then the data can simply be returned to the user in encrypted form, and the user will still be able to verify that the data are in a correct format, handle error messages, perform operation on the data as described above, etc., without decrypting the data.

The format-preserving encryption or decryption operation may preferably be a bijective operation, i.e. an operation which is injective (one-to-one) as well as surjective (onto). In this case, for each decrypted data record there exists one and only one encrypted data record, and for each encrypted data record there exists one and only one decrypted data record. Accordingly, an inverse function exists, and it is possible to uniquely restore the original data from the encrypted version of the data.

In a second aspect the invention provides database server system for computer-implemented communication of electronic data between a computer-readable storage medium for storing such data and a computer-implemented application for performing a read operation to the data,
wherein the data are structured in a first table rows and columns defining a plurality of data cells, wherein the database server system is configured to:
receive a read request from the application to return, from the database server system to the application, data in at least one of the data cells, generate synthetic data and return the synthetic data in place of at least part of the requested data prior to returning the data to the application.

The database server system according to the second aspect of the invention is particularly suitable for performing tests, because test data can be generated "live" and in real time or nearly real time, and therefore a dedicated test platform is not required, since the tests can be performed directly on the production system.

In one embodiment of the present invention, the database server system is a relational database server.

In one embodiment of the present invention, the database server system is one of:
Microsoft SQL Server
Oracle SQL
PostgreSQL
MySQL
Base SAS
SAS Viya
SAP HANA
Snowflake
Redshift
IBM DB2
Microsoft Access
HBASE
Cassandra In one embodiment of the present invention, the format-preserving encryption engine is one of:
embedded into the database server system executable
loaded at runtime, e.g. via a DLL or SO or JAR file
defined in the running system via a scripting language, such as JavaScript.

In one embodiment of the present invention, the format-preserving encryption engine is designed such that the length of the encrypted version of an object is different from the length of the original object. This improves the security of the system, since it is not possible to derive the length of the original data from the encrypted version of the data.

In one embodiment of the present invention, the view providing access to encrypted and/or decrypted data is defined on one database whereas the table storing the actual data is stored on another database.

According to this embodiment, users and applications with access rights which allow access to the actual data, can be granted access to the database where the table storing the actual data is stored, whereas users and applications without such access rights are not granted access to this database, and may instead be granted access to the encrypted version of the data. This improves the security of the system, since it can be efficiently ensured that an unauthorized user or application does not gain access to the decrypted data. However, it is not ruled out that a user or application which is allowed to access the actual data opts to only access to the encrypted version of the data, in the case that a given task does not require the actual data, but can instead be performed on the encrypted version of the data.

In one embodiment of the present invention, users and/or their group membership or authorizations are queried from a user access/rights management system and/or a directory service system, such as Active Directory or LDAP. Active Directory and LDAP are examples of central systems for handling user and user rights. Thus, according to this embodiment, a centralized handling of users and corresponding user rights is provided.

The database server system according to the invention may comprise a format-preserving encryption and decryption engine for performing the format-preserving encryption of the data.

The system may be further configured to manage encryption keys and/or user rights. According to this embodiment, encryption keys and/or user rights are managed at the system, i.e. locally, instead of via a central system. This provides a simple setup.

The read operation may be implemented through an SQL view, and/or create, update and delete operations may be implemented through an SQL Trigger.

According to this embodiment, existing software or application may access the data without realizing that a security layer has been added, i.e. the security layer can be added in a manner which is transparent to users or applications needing to access the data.

The SQL Trigger may comprise one or more SQL Triggers, and at least one of the create, the update and the delete operations may be implemented through the one or more SQL Triggers. This also allows the security layer to be added in a manner which is transparent to users or applications needing to access the data, similarly to the embodiment described above.

The first table may be identified in the database server system by a first name, and the database server system may be configured to perform the following steps prior to receiving the read request and/or the create or update request from the application:
rename the table from the first name into a second name;
create an SQL view identified by the first name of the table;
configure the SQL view for returning data from the first table, wherein the format-preserving encryption or decryption operation is performed when returning at least some of the data from the first table.

According to this embodiment, the procedure can be implemented on an existing database, which is already being used by one or more applications, in a manner which ensures that the previous applications continue to be operational, without requiring that the previous applications are constructed or designed to support the protection provided by the procedure defined by the present invention, and without requiring changes to the existing programming code.

The database server system may be configured to perform at least one of the create, the update and the delete operation through the one or more SQL Triggers.

The data may be stored in an encrypted version in the computer-readable storage medium, and the database system may be configured to:
perform a format-preserving decryption operation to the data in the at least one of the data cells prior to returning the data to the application,
and/or to
perform a format-preserving encryption operation to the data in the at least one of the data cells prior to carrying out the write operation.

According to this embodiment, the data can be protected while "at rest", i.e. while it is stored in the database. However, the data is still available in decrypted form in real time, or nearly in real time, to authorized users and applications.

A first subset of the data cells may include non-encrypted data, and a second subset of the data cells may include encrypted data. The database server system may further include one or more identifiers for identifying the first and/or the second subset of the data cells.

This embodiment is particularly relevant in the case that data needs to be migrated from non-encrypted form to encrypted form. According to this embodiment, it is possible to encrypt data while the system is in use. The encryption operation is performed on the data, one line at the time. During this, the system remains able to respond to queries, since it "knows" which data have already been encrypted, and therefore require decryption, and which data have not yet been subjected it initial encryption, and therefore does not required decryption.

The database may comprise a plurality of first rows including non-encrypted and a plurality of second rows including encrypted data, and the database may further include, in respect of each of the first and second rows of data, an identifier specifying whether or not the data in each respective row is encrypted.

This embodiment may be regarded as a specific implementation of the embodiment described above.

The database may comprise a plurality of rows of data including encrypted data, and the database may further include, in respect of each row of data, an encryption key identifier for identifying an encryption key used for encryption of the encrypted data in each respective row.

According to this embodiment, the same encryption key may not necessarily be applied to all of the data records. Instead, the applied encryption key may differ from one data record to another, or from one group of data to another. This further allows easy switch or updating of encryption keys, e.g. in the following manner. At a given point in time, a new encryption key is put into use for data which is created or updated from that point in time onwards. Furthermore, and in parallel herewith, re-encryption of the data stored in the database is performed, row by row. This could, e.g., be done only at time periods with low load or activity in order to minimize the impact on performance of the system. Thereby it is possible to read the data at any time, regardless of whether or not a requested data record has been migrated to the new encryption key.

The data may be stored in a decrypted version in the computer-readable storage medium, and the database system may be configured to:

perform a format-preserving encryption operation to the data in the at least one of the data cells prior to returning the data to the application,
and/or to
perform a format-preserving decryption operation to the data in the at least one of the data cells prior to carrying out the write operation.

According to this embodiment, the data may be stored in decrypted form, but certain users or applications will only receive the data in encrypted form. Companies or organizations using database server systems may have several database environments, including a production environment and a test or development environment. However, the system according to this embodiment allows tests to be performed directly in a production environment, due to the provide real time protection provided, i.e. a dedicated test or development environment is not necessarily required. This allows for a cheaper and simpler setup.

The database server system according to the invention may be further configured to receive configuration data, user rights data, and/or cryptographic keys from an external computer-implemented system for management of the configuration data, user rights data, and/or the cryptographic keys.

This allows for central control of configuration and management of access rights, thereby providing easy control and homogeneous protection of the data.

The database server system according to the invention may be further configured to carry out the format-preserving encryption and/or decryption operation in accordance with user rights governing if and/or in respect of which data such encryption and/or decryption operation is permitted.

According to this embodiment, access to the encrypted/decrypted data is controlled in accordance with specified access rights, as described above.

Data in a first one of the cells of data may be used as a tweak for the format-preserving encryption and/or decryption of data in a second one of the cells.

According to this embodiment, a significant increase in security can be obtained, because data contained in one field is taken into consideration when encrypting data in another field. This makes it more difficult to "guess" true data values from statistic analysis of the encrypted data For instance, if a column of the database contains postal codes, and it is not relevant to compare data based on postal codes, the format-preserving encryption and/or decryption may be performed based on a tweak taking data contained in another column into consideration. In this case the encryption of a given postal code may result in different encrypted versions. Thereby a malicious party gaining access to the encrypted data will not be able to derive or guess the true postal codes, e.g. by statistically processing the encrypted postal codes and compare this to actual postal codes.

The database server system may further comprise a second table storing a modified version of the data in the first table, wherein:
the second table includes data entered or modified by a specific user of the database server system;
the data in the second table are accessible to and/or viewable by that specific user only;
and wherein the database server system is configured to return, in response to a read request from the specific user, a merged version of the data in the first and second tables.

According to this embodiment, encryption or decryption may be perform in advance, i.e. before the data is requested. Thereby processing power or CPU cycles runtime is not required when the data is requested, and performance of the system can be improved, and latency can be reduced. For instance, at least part of the data, e.g. the most frequently requested data and/or the least sensitive data, may be stored in an encrypted version as well as in a decrypted version.

In one embodiment of the present invention, the encryption engine installed in a database may cooperate with other software components such that other software components can encrypt data to be written to the database such that it can be written directly to the table holding data and/or read data in encrypted form and then decrypt it itself.

According to this embodiment, the data may be encrypted in advance, e.g. by the application which receives the data, rather than when being entered in the database.

In one embodiment of the present invention, different policies are defined. Each policy may for example govern one or more types of content. The policy may
Define who has what kind of access to a data record (e.g. if a given user or application can access data in decrypted form, in encrypted form, or not at all).
Which key(s) are used to encrypt a data record.
Policies for changing encryption keys (e.g. frequency of change; how long old keys are kept/valid, etc.).
Define if encryption should preserve selected properties or details of data, such as the first or last digits of a credit card number or the year of birth of a social security number (for countries where that applies).

According to this embodiment, central control and management is provided, thereby allowing for consistent configuration, efficient control and the ability to maintain a central overview of the system, the users and the data. This is particularly relevant in the case that data needs to be compared across several systems, because in this case consistent protection of the data is required, in order to maintain a high security level, as well as in order to ensure correct use and comparison of the data. For instance, if different encryption keys have been applied in different systems, then it may not be possible to compare the data originating from different systems.

In case other software components also can encrypt/decrypt data, the policies may be shared with such components. This would allow the different software components to cooperate and individually encrypt/decrypt data in a manner that is compatible between the software components.

In one embodiment of the present invention, a database server has an ingestion table for temporarily storing recently received input data and primary table for long-term storage and for performing queries on data.

According to this embodiment, encryption of data may be decoupled from receipt of data. Thereby data may be received fast, and an acknowledgement of receipt can be generated immediately. Encryption and storage of the data in the database may then be performed independently of the receiving step.

In a third aspect, the invention provides a computer system comprising:
a database server system according to the first or second aspect of the invention and embodiments thereof;
a data security management system for management of the configuration data, user rights data, and/or the cryptographic keys at the database server system.

The data security management system may be connectable to the database server system so as to enable at least one of:
configuration of policies for user and/or administrator access rights to the data;

configuration of encryption and/or decryption keys;
configuration of parameters for encryption and/or decryption;
analysis of the data stored in the database server system and their data structure in the database;
monitoring of users' access to data in the database server system;
monitoring of performance of the database server system.

In a fourth aspect, the invention provides a computer system comprising:
a database server system according to any of the previous aspects and embodiments of the invention;
a data ingestion table for receiving and temporarily storing input data records;
a component for receiving the input data records, encrypting at least portions thereof and storing the input data records in the first table in the database.

In a fifth aspect, the invention provides a data security management system for management of the configuration data, user rights data, and/or the cryptographic keys in a computer system according to the third aspect of the invention.

BRIEF DESCRIPTION OF THE DRAWINGS

Embodiments of the invention will now be further described with reference to the accompanying drawings, wherein.

DETAILED DESCRIPTION OF EMBODIMENTS OF THE INVENTION

Figure 1:
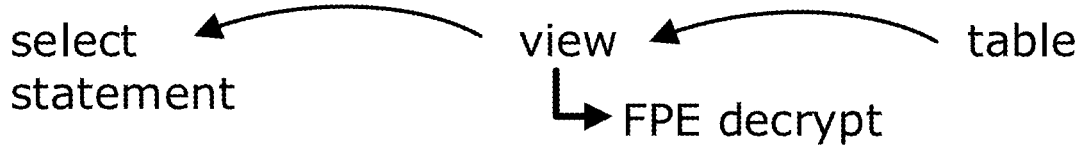
FIG. 1 illustrates how records read from a table storing data in encrypted form are decrypted before being returned as result of the query. An SQL select statement is executed against the database. This statement hits a view which is constructed such that a format-preserving decryption (FPE) method is called for the columns containing data in encrypted form.

FIG. 1 shows how data stored can be read when stored in a database where selected cells are stored in encrypted form using format-preserving encryption.

The SQL select statement executed against the database hits a view (this may be unknown to the user/application using the database; they may believe that they are performing the query directly against a table). The view is constructed such that the encrypted cells are decrypted using format-preserving encryption before the result sent back as result to the SQL select statement.

The view may be constructed such that it verifies the identity of the entity performing the query and determines if that entity is entitled to receive data in decrypted form. If the entity is not entitled to receive data in decrypted form, data may be returned in encrypted form, the cells otherwise holding encrypted data may be returned as empty, or an error may be triggered.

For some applications, it this process may be reversed such that data is stored in non-encrypted form but is encrypted before being returned as result to the select statement.

Figure 2:
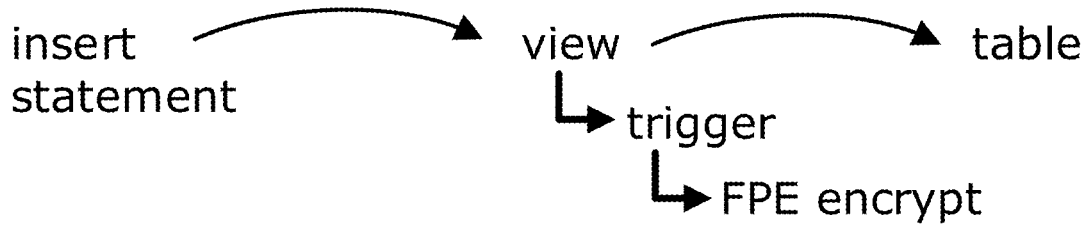
FIG. 2 illustrates how records written to a table storing data in encrypted form are encrypted before being stored. An SQL insert statement is executed against the database. This statement hits a view which activate a trigger defined on the view. This trigger is constructed such that a format-preserving encryption method is called for the columns which store data in encrypted form such that the appropriate columns are encrypted before being stored.

FIG. 2 shows how data can be encrypted before being stored in a database where selected cells are stored in encrypted form using format-preserving encryption.

The SQL insert statement executed against the database hits a view. This view has a trigger defined which is activated by the insert statement. This trigger is constructed such that the relevant cells are encrypted using format-preserving encryption before being stored in the actual table.

The trigger may be constructed such that it verifies the identity of the entity performing the query and determines if that entity is entitled to write data in encrypted form. If the entity is not entitled to write data in encrypted form, data may be written in non-encrypted form (information indicating that the given cell is not encrypted may be appended to the data stored in the cell, stored in another cell, stored in another table, or kept elsewhere), or an error may be triggered.

Figure 3:
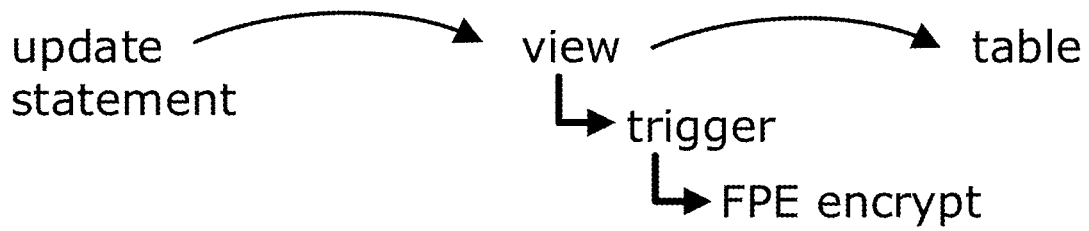
FIG. 3 illustrates how records are updated in a table storing data in encrypted form are encrypted before being stored. An SQL update statement is executed against the database. This statement hits a view which activate a trigger defined on the view. This trigger is constructed such that a format-preserving encryption method is called for the columns which store data in encrypted form such that the appropriate columns are encrypted before being stored.

FIG. 3 shows how data can be encrypted during an update operation.

Figure 4:
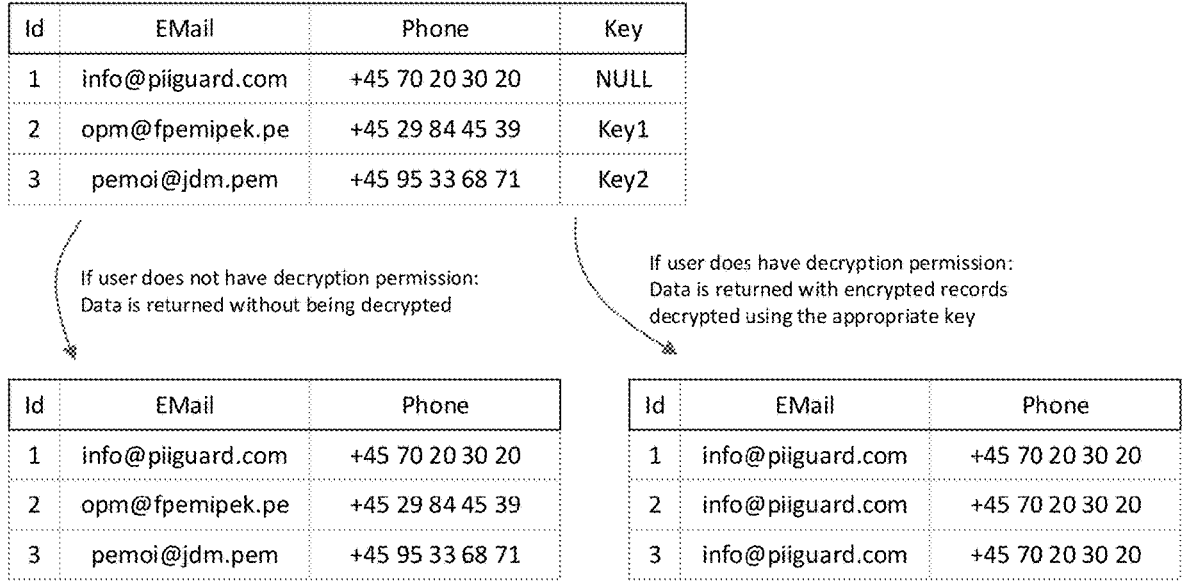
FIG. 4 illustrates an example of how rows can be encrypted under different keys and how it can be identified if a row is encrypted or not.

FIG. 4 illustrates an example of how rows can be encrypted under different keys and how it can be identified if a row is encrypted or not. In the example, the "Key" column indicates if a given row is encrypted (a non-NULL value means that the row is encrypted, the NULL value indicates that the row is not encrypted). If the row is encrypted, the "Key" column identifies that key to use for decrypting the encrypted cells of the row. It is furthermore illustrated how a user without decryption permission gets an unaltered copy of the encrypted data whereas a user with decryption permission gets a decrypted copy of the encrypted data. The example furthermore illustrates how different encryption keys will result in differently encrypted data. In the example, all rows in decrypted form contains the same values column-by-column, whereas they contain different values column-by-column since they are encrypted using different keys (and one row is not encrypted at all).

Figure 5:
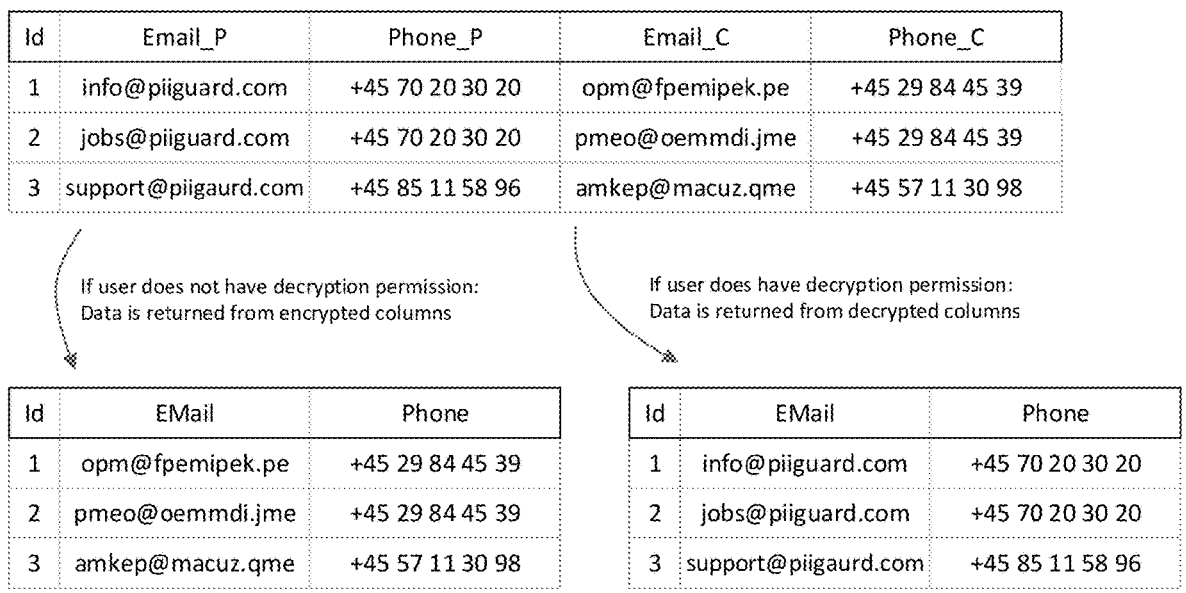
FIG. 5 illustrates how data can be stored in both encrypted and decrypted form.

FIG. 5 illustrates how data can be stored in both encrypted and decrypted form. Depending on the user's permissions, either the encrypted or the decrypted version of the data is returned. The functionality of FIG. 5 can also be implemented by other means, such as for example by storing the encrypted data in one table and the decrypted data in another table.

If data is stored in both encrypted and decrypted form (in same table, in different tables, or otherwise), then appropriate functionality/logic may be applied (e.g. via SQL Triggers) to ensure that eventual updates to data in either form is applied appropriately to the other. For example: If a record is updated in decrypted form, then the data should be encrypted such that the encrypted form is also updated. In this way, it can be assured that encrypted and decrypted data are kept in sync.

Figure 6:
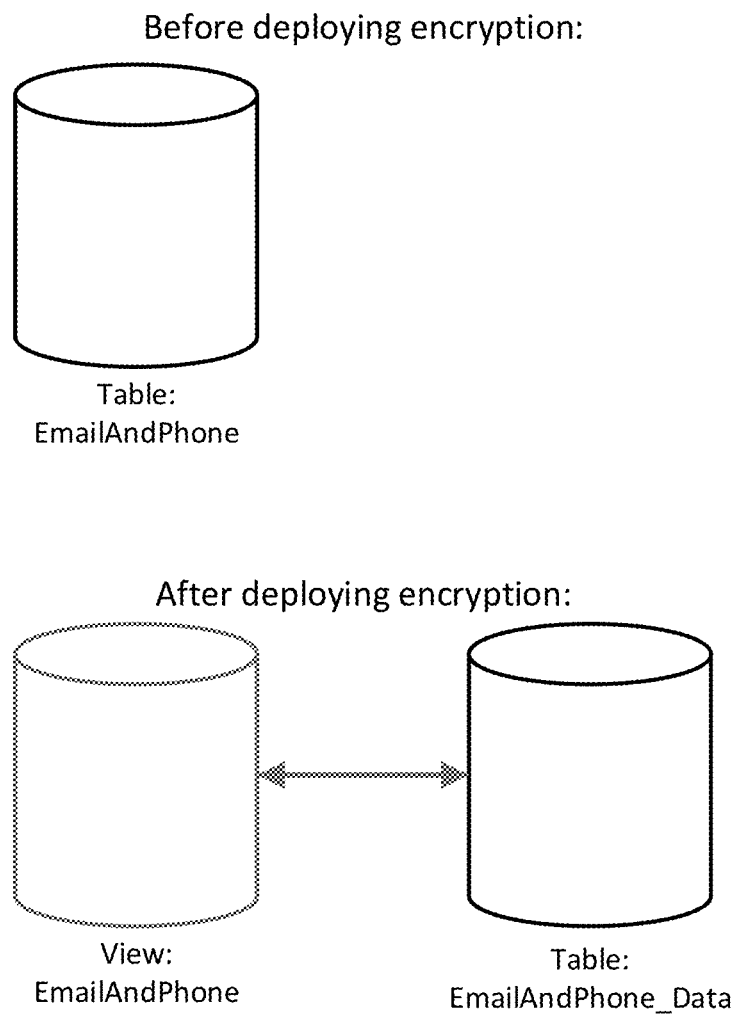
FIG. 6 illustrates how encryption can be deployed on an existing database already used by a user or an application.

FIG. 6 illustrates how encryption can be deployed on an existing database already used by a user or an application. Before encryption is deployed the user or application accesses a table directly. In order to deploy encryption, the following steps are carried out:

1. The table holding the data (named "EmailAndPhone" in the top of the figure) to be protected is renamed (new name is "EmailAndPhone_Data" in the lower right of the figure).
2. A view is created under the table's original name ("EmailAndPhone" in the figure). The view is configured to access data in the original table under the table's new name.
3. Eventual triggers are configured on the view.
4. The content of the renamed table is encrypted.

Hereby, the user or application can operate exactly as before the encryption was deployed, but now with the security features offered by the encryption. This may be combined with the techniques illustrated in FIG. 4 or 5 in order to allow for the encryption process of step 4 to be performed at a later point of time (eventually multiple steps each processing a portion of the data) and/or in parallel with the user or application's access to the data without interfering with the application.

Figure 7:
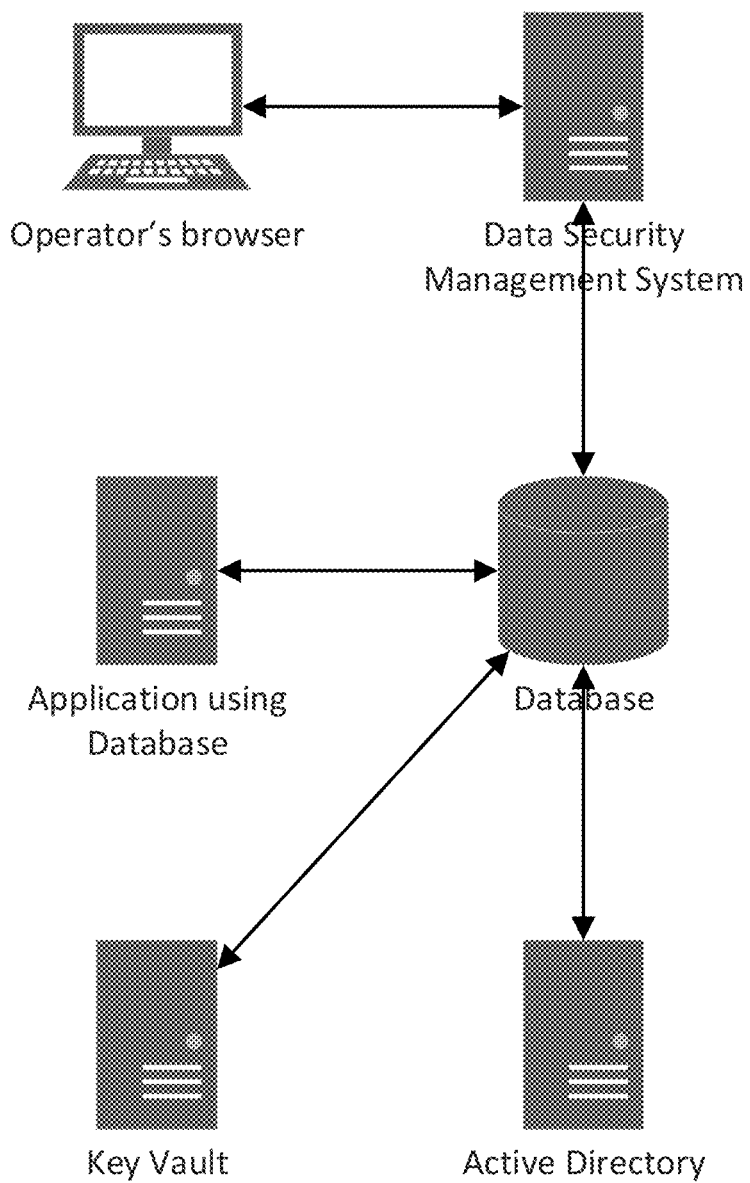
FIG. 7 illustrates how to manage, monitor, and configure encryption of data in a database.

FIG. 7 illustrates how to manage, monitor, and configure encryption of data in a database. The Data Security Management System is operated by an operator (e.g. via a browser). The Data Security Management System interacts with the Database in order to perform one or more of the following operations:

Detect layout (i.e. identify tables and what columns etc. they have).
Detect content (i.e. what type of data is stored in which columns in the tables).
Set up and configure protection of data (e.g. as illustrated in FIG. 6). The configuration may be based on the detected layout and what kind of content the individual columns store, as detected in previous bullets.
Configure access rights (including which users should be allowed to access data in decrypted form, which should be allowed to access data in encrypted form, and which does not have access). Note that access rights may differ for individual columns, for example based on the columns content.

The server labelled "Application using Database" symbolized an application accessing data on the database. This application typically accesses the database under a user account to which the application's rights are linked. A human user may access the database in place of the application The database may for example store encryption keys itself (for example in encrypted form), retrieve keys from a Key Vault and/or from the Data Security Management System. If the database stores keys itself in encrypted form, then the master key used to decrypt the keys may be retrieved from a Key Vault or from the Data Security Management System.

User credentials, access rights, group membership, etc. may be handled by a user access/rights management system or a directory service system such as Active Directory or LDAP.

By applying the technique illustrated in FIGS. 1, 2, and/or 3, the functionality of illustrated in FIGS. 4, 5, 6 and 7 can be transparent to the user or application operating on the database/executing queries on the database.

EMBODIMENTS OF THE INVENTION

The invention and embodiments thereof are generally defined as follows:

1. A database server system for computer-implemented communication of electronic data between a computer-readable storage medium for storing such data and a computer-implemented application for performing at least one of create, read, update and delete operations to the data, wherein the data are structured in a first table of rows and columns defining a plurality of data cells, wherein the database server system is configured to:
receive a read request from the application to return, from the database server system to the application, data in at least one of the data cells, and perform a format-preserving encryption or decryption operation to the data in the at least one of the data cells prior to returning the data to the application,
and/or to
receive a create or an update request from the application, wherein the create or update request causes a write operation to at least one of the data cells in the storage medium, and perform a format-preserving encryption or decryption operation to the data in the at least one of the data cells prior to carrying out the write operation.

2. A database server system according to embodiment 1, wherein the computer-readable storage medium is configured to store a non-encrypted version of the data and a format-preserved encrypted version of the data, and wherein the read request, and the create or update request causes access to a selected one of the non-encrypted version of the data and the format-preserved encrypted version of the data.

3. A database server system according to embodiment 1 or 2, comprising a format-preserving encryption and decryption engine for performing the format-preserving encryption of the data.

4. A database server system according to any of embodiments 1-3, wherein the system is further configured to manage encryption keys and/or user rights.

5. A database server system according to any of the preceding embodiments, wherein the read operation is implemented through an SQL view, and/or wherein create, update and delete operations are implemented through an SQL Trigger.

6. A database server system according to embodiment 5, wherein the SQL Trigger comprises one or more SQL Triggers, and wherein at least one of the create, the update and the delete operation are implemented through the one or more SQL Triggers.

7. A database server system according to any of the preceding embodiments, wherein the first table is identified in the database server system by a first name, and wherein the database server system is configured to perform the following steps prior to receiving the read request and/or the create or update request from the application:
rename the table from the first name into a second name;
create an SQL view identified by the first name of the table;
configure the SQL view for returning data from the first table, wherein the format-preserving encryption or decryption operation is performed when returning at least some of the data from the first table.

8. A database server system according to embodiments 6 and 7, wherein the database server system is configured to perform at least one of the create, the update and the delete operation through the one or more SQL Triggers.

9. A database server system according to any of the preceding embodiments, wherein the data are stored in an encrypted version in the computer-readable storage medium, and wherein the database system is configured to:
perform a format-preserving decryption operation to the data in the at least one of the data cells prior to returning the data to the application,
and/or to
perform a format-preserving encryption operation to the data in the at least one of the data cells prior to carrying out the write operation.

10. A database server system according to embodiment 9, wherein a first subset of the data cells include non-encrypted data, and wherein a second subset of the data cells include encrypted data, and wherein the database server system further includes one or more identifiers for identifying the first and/or the second subset of the data cells.

11. A database server system according to embodiment 9 or 10, wherein the database comprises a plurality of first rows including non-encrypted and a plurality of second rows including encrypted data, and wherein the database further includes, in respect of each of the first and second rows of data, an identifier specifying whether or not the data in each respective row is encrypted.

12. A database server system according to embodiment 9 or 10, wherein the database comprises a plurality of rows of data including encrypted data, and wherein the database further includes, in respect of each row of data, an encryption key identifier for identifying an encryption key used for encryption of the encrypted data in each respective row.

13. A database server system according to any of the preceding embodiments, wherein the data are stored in a decrypted version in the computer-readable storage medium, and wherein the database system is configured to:
perform a format-preserving encryption operation to the data in the at least one of the data cells prior to returning the data to the application,
and/or to
perform a format-preserving decryption operation to the data in the at least one of the data cells prior to carrying out the write operation.

14. A database server system according to any of the preceding embodiments, further configured to receive configuration data, user rights data, and/or cryptographic keys from an external computer-implemented system for management of the configuration data, user rights data, and/or the cryptographic keys.

15. A database server system according to any of the preceding embodiments, further configured to carry out the format-preserving encryption and/or decryption operation in accordance with user rights governing if and/or in respect of which data such encryption and/or decryption operation is permitted.

16. A database server system according to any of the preceding embodiments, further configured to use data in a first one of the cells of data as a tweak for the format-preserving encryption and/or decryption of data in a second one of the cells.

17. A database server system for computer-implemented communication of electronic data between a computer-readable storage medium for storing such data and a computer-implemented application for performing a read operation to the data, wherein the data are structured in a first table rows and columns defining a plurality of data cells, wherein the database server system is configured to:
receive a read request from the application to return, from the database server system to the application, data in at least one of the data cells, generate synthetic data and return the synthetic data in place of at least part of the requested data prior to returning the data to the application.

18. A database server system according to any of the preceding embodiments, further comprising a second table storing a modified version of the data in the first table, and wherein:
the second table includes data entered or modified by a specific user of the database server system;
the data in the second table are accessible to and/or viewable by that specific user only;
and wherein the database server system is configured to return, in response to a read request from the specific user, a merged version of the data in the first and second tables.

19. A computer system comprising:
a database server system according to any of the preceding embodiments;
a data security management system for management of the configuration data, user rights data, and/or the cryptographic keys at the database server system.

20. A computer system according to embodiment 19, wherein the data security management system is connectable to the database server system so as to enable at least one of:
configuration of policies for user and/or administrator access rights to the data;
configuration of encryption and/or decryption keys;
configuration of parameters for encryption and/or decryption;
analysis of the data stored in the database server system and their data structure in the database;
monitoring of users' access to data in the database server system;
monitoring of performance of the database server system.

21. A computer system comprising:
a database server system according to any of the preceding embodiments;
a data ingestion table for receiving and temporarily storing input data records;
a component for receiving the input data records, encrypting at least portions thereof and storing the input data records in the first table in the database.

22. A data security management system for management of the configuration data, user rights data, and/or the cryptographic keys in a computer system according to embodiment 20.

The invention claimed is:

1. A database server system for computer-implemented communication of electronic data, the system comprising:
a computer having a computer-readable storage medium for storing data; and
a computer-implemented application for performing at least one of create, read, update and delete operations to the data on the computer,
wherein the data are structured in a first table of rows and columns defining a plurality of data cells,
wherein the database server system is configured to receive a read request from a user of the computer-implemented application to return, from the database server system to the computer-implemented application on the computer, data in at least one of the data cells, and perform a format-preserving encryption or decryption operation to the data in the at least one of the data cells prior to returning the data to the computer-implemented application, wherein the database server system is further configured to carry out the format-preserving encryption or decryption operation in accordance with user rights governing which data the user is permitted to access, wherein the computer-implemented application returns the data in decrypted form to users which are allowed to access data in decrypted form and returns the data in encrypted form to users which are allowed to access data in encrypted form, wherein the computer-implemented application is configured to allow users which are allowed to access data in encrypted form but not in decrypted form to perform at least one of the create, read, update and delete operations to the data in encrypted form with the computer-implemented application.

2. The database server system according to claim 1, wherein the computer-readable storage medium is configured to store a non-encrypted version of the data and a format-preserved encrypted version of the data, and wherein the read request, and the create or update request causes access to a selected one of the non-encrypted version of the data and the format-preserved encrypted version of the data.

3. The database server system according to claim 1, comprising a format-preserving encryption and decryption engine for performing the format-preserving encryption of the data.

4. The database server system according to claim 1, wherein at least one of the follow operations is implemented:
the read operation is implemented through a Structure Query Language (SQL) view, or
the create, update and delete operations are implemented through an SQL Trigger, and
wherein the SQL Trigger comprises one or more SQL Triggers, and
wherein at least one of the create, the update and the delete operation are implemented through the one or more SQL Triggers.

5. The database server system server system according to claim 1, wherein the first table is identified in the database server system by a first name, and
wherein the database server system is configured to perform the following steps prior to receiving at least one of the read, create, or update requests from the computer-implemented application:
rename the table from the first name into a second name;
create a Structure Query Language (SQL) view identified by the first name of the table;
configure the SQL view for returning data from the first table,
wherein the format-preserving encryption or decryption operation is performed when returning at least some of the data from the first table.

6. The database server system according to claim 1, wherein the data are stored in an encrypted version in the computer-readable storage medium, and
wherein the database system is configured to perform at least one of the following operations:
a format-preserving decryption operation to the data in the at least one of the data cells prior to returning the data to the computer-implemented application, or
a format-preserving encryption operation to the data in the at least one of the data cells prior to carrying out a write operation.

7. The database server system according to claim 6, wherein the database comprises a plurality of first rows including non-encrypted and a plurality of second rows including encrypted data, and
wherein the database further includes, in respect of each of the first and second rows of data, an identifier specifying whether or not the data in each respective row is encrypted.

8. The database server system according to claim 6, wherein the database comprises a plurality of rows of data including encrypted data, and
wherein the database further includes, in respect of each row of data, an encryption key identifier for identifying an encryption key used for encryption of the encrypted data in each respective row.

9. The database server system according to claim 1, wherein the data are stored in a decrypted version in the computer-readable storage medium, and
wherein the database system is configured to perform at least one of the following operations:
a format-preserving encryption operation to the data in the at least one of the data cells prior to returning the data to the computer-implemented application, or
a format-preserving decryption operation to the data in the at least one of the data cells prior to carrying out a write operation.

10. The database server system according to claim 1, further configured to receive at least one of configuration data, user rights data, or cryptographic keys from an external computer-implemented system for management of at least one of the configuration data, the user rights data, or the cryptographic keys.

11. The database server system according to claim 1, further configured to use data in a first one of the cells of data as a tweak for the format-preserving encryption or decryption of data in a second one of the cells.

12. The database server system according to claim 1, further comprising a second table storing a modified version of the data in the first table, and wherein:
the second table includes data entered or modified by a specific user of the database server system;
the data in the second table are at least accessible to or viewable by that specific user only; and
wherein the database server system is configured to return, in response to a read request from the specific user, a merged version of the data in the first and second tables.

13. The database server system according to claim 1, further configured to receive a create or an update request from the computer-implemented application, wherein the create or update request causes a write operation to at least one of the data cells in the computer-readable storage medium and to perform a format-preserving encryption or decryption operation to the data in the at least one of the data cells prior to carrying out the write operation.

14. The database server system according to claim 1, wherein the format-preserving encryption or decryption operation is a bijective operation configured to generate only one encrypted data record for each unique decrypted data record and only one decrypted data record for each unique encrypted data record.

15. A computer system comprising:
the database server system according to claim 1;
a data security management system operable by an operator via a browser and arranged to manage at least one of configuration data, user rights data, or cryptographic keys at the database server system, wherein the data security management system is connectable to the database server system so as to enable at least one of:

configuration of policies for at least one of the user or an administrator access rights to the data;

configuration of at least one of encryption or decryption keys;

configuration of at least one of parameters for encryption or decryption;

analysis of the data stored in the database server system and their data structure in the database;

monitoring of users' access to data in the database server system; and monitoring of performance of the database server system.

16. A computer system comprising:

the database server system according to claim 1, wherein the database server system includes a data ingestion table receiving and temporarily storing input data records; and a software component receiving the input data records, encrypting at least portions thereof and storing the input data records in the first table in the database.

\* \* \* \* \*